US012611989B2

(12) United States Patent
Wei et al.

(10) Patent No.: US 12,611,989 B2
(45) Date of Patent: *Apr. 28, 2026

(54) CAMERA MONITOR SYSTEM FOR COMMERCIAL VEHICLES INCLUDING WHEEL POSITION ESTIMATION

(71) Applicant: Stoneridge Electronics AB, Solna (SE)

(72) Inventors: Wenpeng Wei, East Lansing, MI (US); Liang Ma, Rochester, MI (US); Yifan Men, Northville, MI (US); Troy Otis Cooprider, White Lake, MI (US)

(73) Assignee: Stoneridge Electronics AB, Solna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/817,612

(22) Filed: Aug. 28, 2024

(65) Prior Publication Data

US 2024/0416837 A1 Dec. 19, 2024

Related U.S. Application Data

(63) Continuation of application No. 18/080,031, filed on Dec. 13, 2022, now Pat. No. 12,115,917.

(60) Provisional application No. 63/293,199, filed on Dec. 23, 2021.

(51) Int. Cl.
*B60R 1/25* (2022.01)
*G06V 20/56* (2022.01)

(52) U.S. Cl.
CPC ................ *B60R 1/25* (2022.01); *G06V 20/56* (2022.01); *B60R 2300/30* (2013.01); *B60R 2300/80* (2013.01)

(58) Field of Classification Search
CPC ... B60R 1/25; B60R 2300/30; B60R 2300/80; G06V 20/56; G06T 2207/10016; G06T 2207/30252; G06T 7/73
USPC .......................................................... 348/148
See application file for complete search history.

*Primary Examiner* — Marnie A Matt
(74) *Attorney, Agent, or Firm* — Carlson, Gaskey & Olds, P.C.

(57) ABSTRACT

A method for estimating a trailer wheel position includes identifying a first set of wheel locations in a first image. Each of the wheel locations in the first set of wheel locations is associated with a corresponding trailer angle. The first set of wheel locations is clustered and a primary cluster in the first set of wheel locations is identified. A best fit curve is applied to the primary cluster. The best fit curve is a curve associating wheel position to trailer angle. An estimated wheel position is determined by applying a determined trailer angle to the best fit curve in response to the wheel being hidden in the first image. The estimated wheel position is output to at least one additional vehicle system.

36 Claims, 7 Drawing Sheets

CAMERA MONITOR SYSTEM FOR COMMERCIAL VEHICLES INCLUDING WHEEL POSITION ESTIMATION

CROSS-REFERENCE TO RELATED APPLICATION

This application is a continuation of U.S. application Ser. No. 18/080,031, filed Dec. 13, 2022, which claims priority to U.S. Provisional Patent Application No. 63/293,199, filed on Dec. 23, 2021.

TECHNICAL FIELD

This disclosure relates to wheel tracking using a camera monitor system (CMS) of a commercial truck, and more specifically to a system and method for tracking a wheel position while the wheel is hidden.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the mirror replacement systems cover a larger field of view than a conventional mirror, or include views that are not fully obtainable via a conventional mirror.

Semi-automated driver assist systems, camera monitor systems, electronic stability program systems, and other vehicle systems, use or require knowledge about the location of various vehicle features throughout operation of the vehicle. Among those features can be a real world position or a position in an image of one or more of the rear wheels of the trailer. Systems exist for tracking the position of the wheel while it is visible within the field of view of a rear facing camera monitor system camera. However, while the trailer is at a low trailer angle the rear trailer wheels are not be visible in the field of view of either the driver or passenger side cameras and the real world position of the wheels, and the position of the wheels in the image, is unknown.

SUMMARY OF THE INVENTION

An exemplary method for estimating a trailer wheel position including identifying a first set of wheel locations in at least a first image, each of the wheel locations in the first set of wheel locations being associated with a corresponding trailer angle, clustering the first set of wheel locations and identifying a primary cluster in the first set of wheel locations, generating a best fit curve applied to the primary cluster, the best fit curve being a curve associating wheel position to trailer angle, identifying an estimated wheel position by applying a determined trailer angle to the best fit curve in response to the wheel being hidden in the first image, and outputting the estimated wheel position to at least one additional vehicle system.

Another example of the above described method for estimating a trailer wheel position further includes identifying a second set of wheel locations in at least a second image, each of the wheel locations in the second image being associated with a corresponding trailer angle.

Another example of any of the above described methods for estimating a trailer wheel position further includes clustering the second set of wheel locations and identifying a second primary cluster in the second set of wheel locations.

In another example of any of the above described methods for estimating a trailer wheel position the first image is one of a class II and a class IV view and the second image is a class II and a class IV view on an opposite side of the vehicle.

In another example of any of the above described methods for estimating a trailer wheel position generating the best fit curve applied to the primary cluster of the first set includes generating a best fit curve applied to both the primary cluster of the first set and the primary cluster of the second set.

In another example of any of the above described methods for estimating a trailer wheel position extending the best fit curve beyond the primary cluster includes extending the best fit curve from a first end of the first primary cluster to a first end of the second primary cluster, and wherein a region of the best fit curve extending from the first end of the first cluster to the first end of the second primary cluster corresponds to wheel locations while the trailer has a trailer angle sufficiently low that the wheel is not visible.

In another example of any of the above described methods for estimating a trailer wheel position the low trailer angle is a trailer angle range of −10 degrees to +10 degrees In another example of any of the above described methods for estimating a trailer wheel position the best fit curve is at least a second order function.

In another example of any of the above described methods for estimating a trailer wheel position the best fit curve is one of a second order function and a third order function.

In another example of any of the above described methods for estimating a trailer wheel position identifying the first primary cluster comprises identifying the cluster including at least one of the greatest number of points in the cluster and the largest cluster span.

Another example of any of the above described methods for estimating a trailer wheel position further includes applying at least one of a Kalman filter, a least-square filter, and a recursive least-square filter to the primary cluster prior to generating the best fit curve.

In another example of any of the above described methods for estimating a trailer wheel position the at least one additional vehicle system includes at least one of an advanced driver assistance systems, a camera monitor systems, and an electronic stability programs.

In one exemplary embodiment a camera monitor system (CMS) for a commercial vehicle includes at least a first mirror replacement camera having a first field of view defining a side view on a first side of the vehicle and a second mirror replacement camera having a second field of view defining a side view on a second side of the vehicle, a camera monitor system controller communicatively connected to each of the first mirror replacement camera and the second mirror replacement camera such that the camera monitor system controller receives a first video feed from the first camera and a second video feed from the second camera; the camera monitor system controller including a memory and a processor, the memory storing instructions configured to cause the processor to determine a wheel position estimation by identifying a first set of wheel locations in at least the first video feed, each of the wheel locations in the first set of wheel locations being associated with a corresponding trailer angle, clustering the first set of wheel locations and identifying a primary cluster in the first set of wheel locations, and generating a best fit curve applied to the primary cluster, the best fit curve being a curve associating wheel position to trailer angle, and the memory further storing instructions configured to cause the controller to respond to a wheel position being indeterminable in at least one of the first field of view and the second field of view by estimating a wheel position based on wheel positions identified while the wheel position was determinable.

In another example of the above described camera monitor system for a commercial vehicle estimating a wheel position based on wheel positions identified while the wheel position was determinable comprises identifying a point on the best fit curve corresponding to a currently detected trailer angle, wherein the point on the best fit curve is the estimated wheel position.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
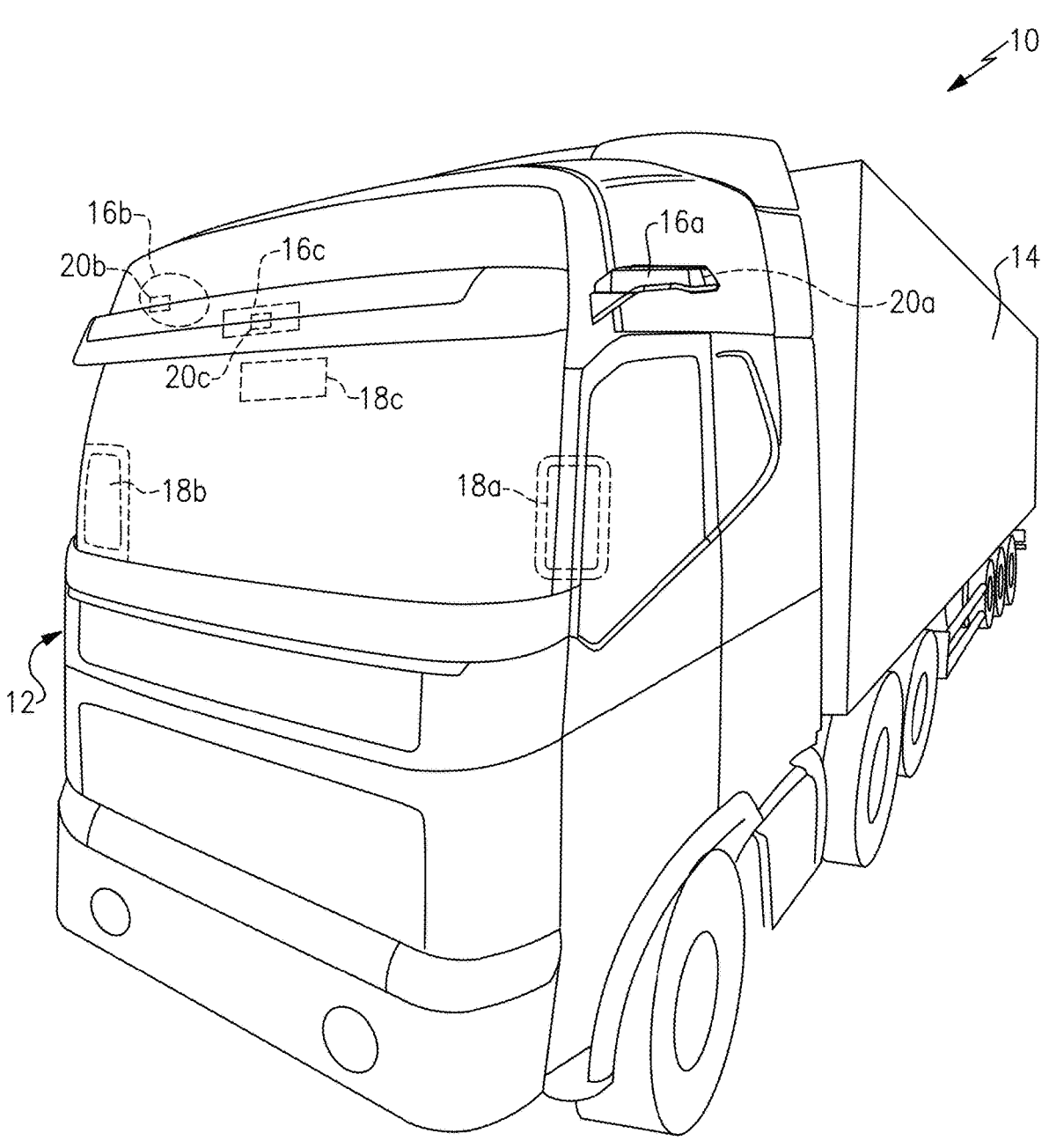
FIG. 1A is a schematic front view of a commercial truck with a camera monitor system (CMS) used to provide at least Class II and Class IV views.
Figure 1B:
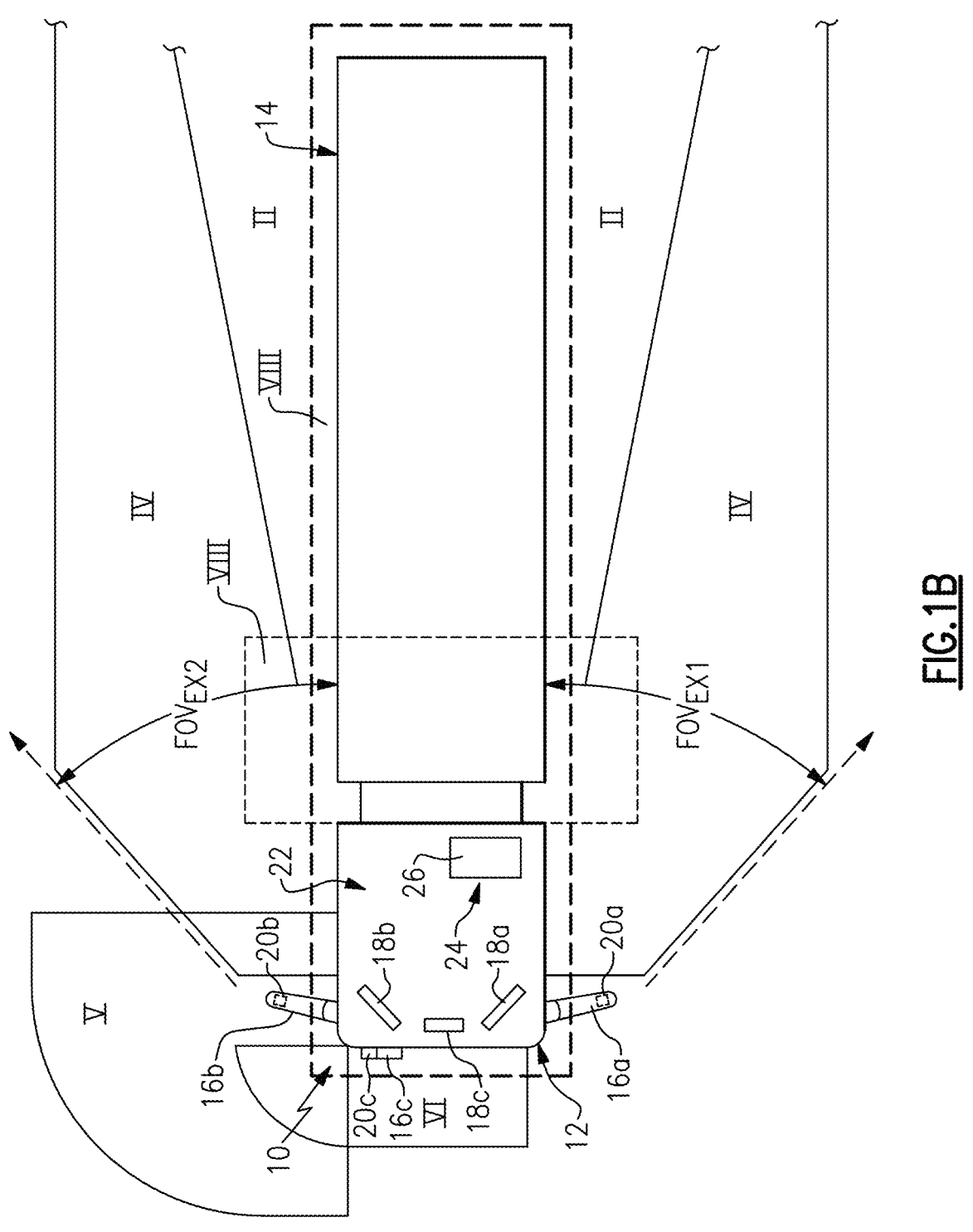
FIG. 1B is a schematic top elevational view of a commercial truck with a camera monitor system providing Class II, Class IV, Class V and Class VI views.
Figure 2:
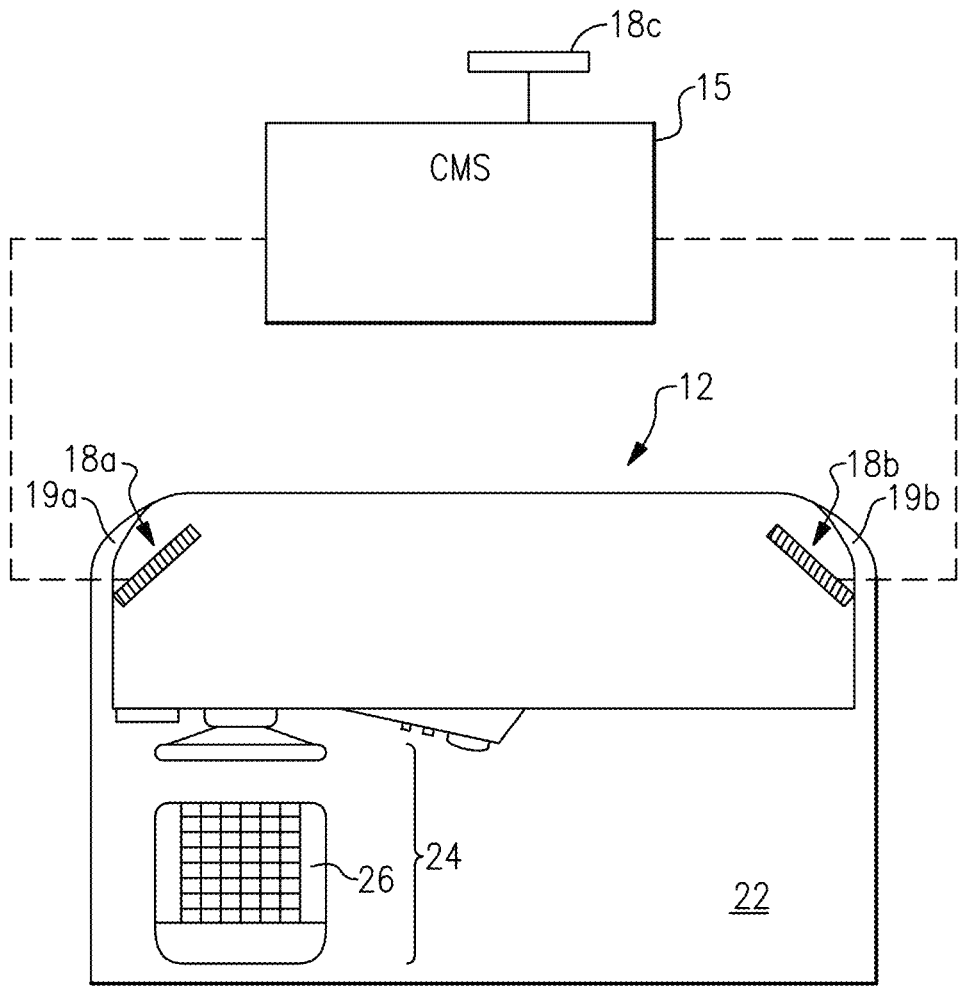
FIG. 2 is a schematic top perspective view of an vehicle cabin including displays and interior cameras.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied to other types of vehicles. The vehicle 10 incorporates a camera monitor system (CMS) 15 (FIG. 2) that has driver and passenger side camera arms 16a, 16b mounted to the outside of the vehicle cab 12. If desired, camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. Class II and Class IV views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If video of Class VIII views is desired, camera housings can be disposed at the sides and rear of the vehicle 10 to provide fields of view including some or all of the Class VIII zones of the vehicle 10. As illustrated, the Class VIII view includes views immediately surrounding the trailer, and in the rear proximity of the vehicle including the rear of the trailer. In one example, a view of the rear proximity of the vehicle is generated by a rear facing camera disposed at the rear of the vehicle, and can include both the immediate rear proximity and a traditional rear view (e.g. a view extending rearward to the horizon, as may be generated by a rear view mirror in vehicles without a trailer). In such examples, the third display 18c can include one or more frames displaying the Class VIII views. Alternatively, additional displays can be added near the first, second and third displays 18a, 18b, 18c and provide a display dedicated to providing a Class VIII view.

Figure 3A:
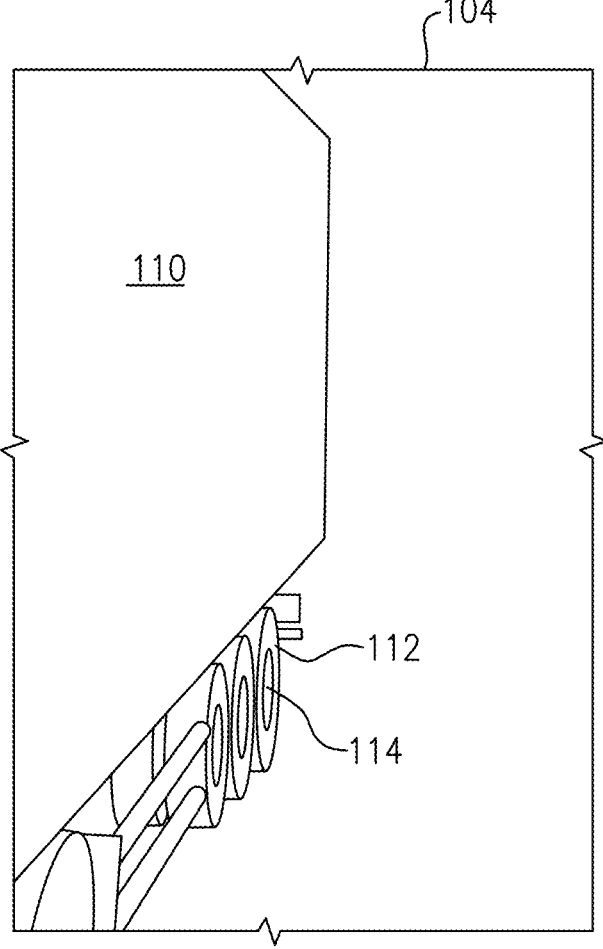
FIG. 3A illustrates a camera monitor system view including a single view of a vehicle trailer at a mid to large trailer angle.
Figure 3B:
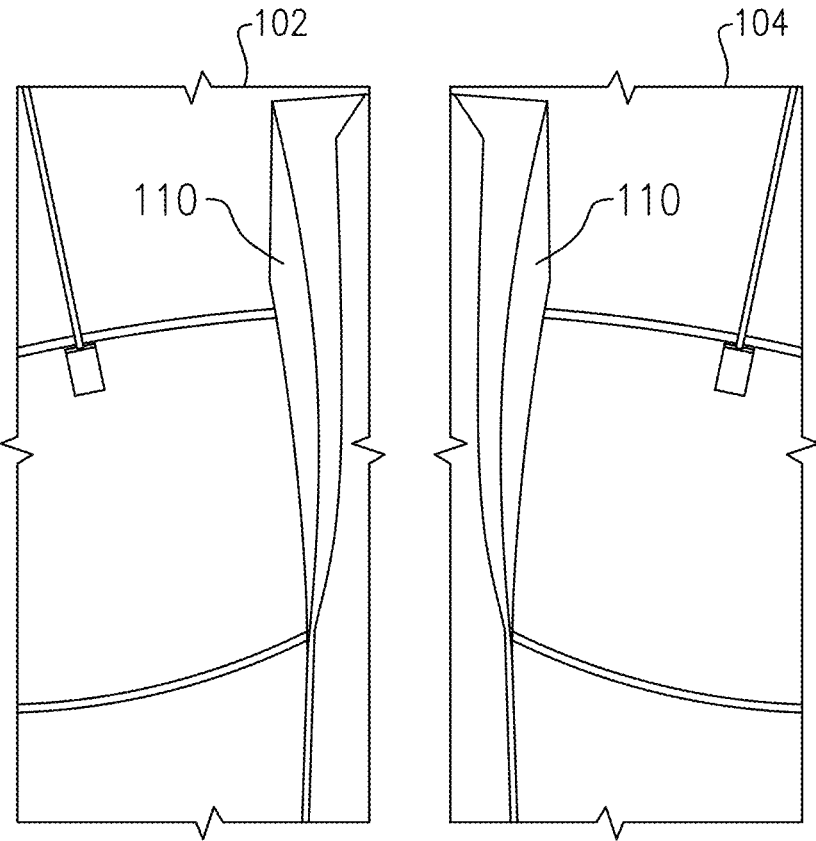
FIG. 3B illustrates a camera monitor system view including two views of a vehicle trailer at a low trailer angle.

With continued reference to FIGS. 1A to 2, FIG. 3A schematically illustrates a rear view displayed to a vehicle operator via the CMS described above, while the trailer 110 is at a mid to large (e.g., greater than 10 degree) angle. While at the mid to large trailer angle, the trailer 110 is minimally visible in the opposite view, if it is visible at all, and the opposite view is omitted. FIG. 3B schematically illustrates the trailer 110 in both a driver side display 102 and a passenger side display 104. While the trailer 110 is at the mid to large angle, a rearmost wheel 112 is visible in the corresponding view 104. In contrast, when the trailer 110 is at a low trailer angle (FIG. 3B), the wheel 112 is not visible. As it is not visible, the wheel 112 is referred to as hidden. While the exact angle at which the wheel 112 becomes hidden will depend on the position of the camera generating the view, and the length of the trailer 110, the wheel 112 is typically hidden at the low angles (e.g. between 10 and −10 degrees).

In order to facilitate vehicle systems relying on the wheel 112 position, such as advanced driver assistance systems, camera monitor systems, electronic stability programs, and similar vehicle systems, the CMS monitors the views 102, 104 and identifies the wheel position 112 during any operating condition where the wheel 112 is visible. Existing object tracking systems can identify the wheel 112 when it is visible and track the center point 114 of the wheel 112 as it travels through the image. The position in the image can then be translated to a real world 3D position again using known systems. In addition to using these monitored wheel positions, the CMS generates a data set from each image, with each point in each of the data sets identifying a center point 114 of the wheel 112 in the image, and coordinating the center point 114 of the wheel 112 with an angle of the trailer 110 at which the wheel position was detected. The angle of the trailer 110 is detected using one of a trailer angle sensor, CMS image analysis, or a combination of the two.

Based on relationships established using the wheel 112 detections and trailer angles while the wheel(s) 112 are visible, the CMS is configured to determine a best fit curve for estimating the wheel 112 positions while the wheel(s) 112 are hidden during the low angles shown in FIG. 3B and while the wheel is hidden due to other external effects. The estimated wheel positions are provided to any CMS or other vehicle systems that use the information, thereby providing a continuous wheel position to the CMS or other vehicle systems.

Figure 6:
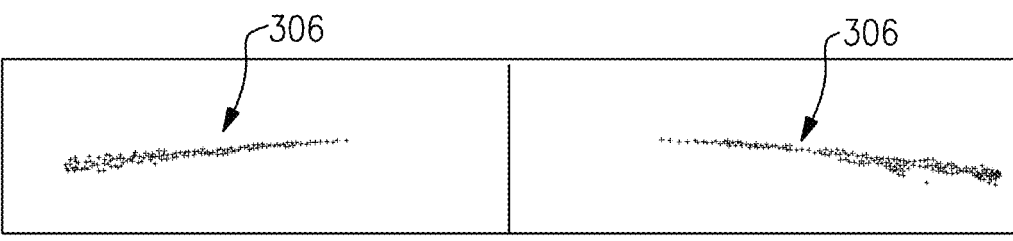
FIG. 6 illustrates the data set of FIG. 4 reduced to a primary cluster within each image.
Figures 7, 8, 9:
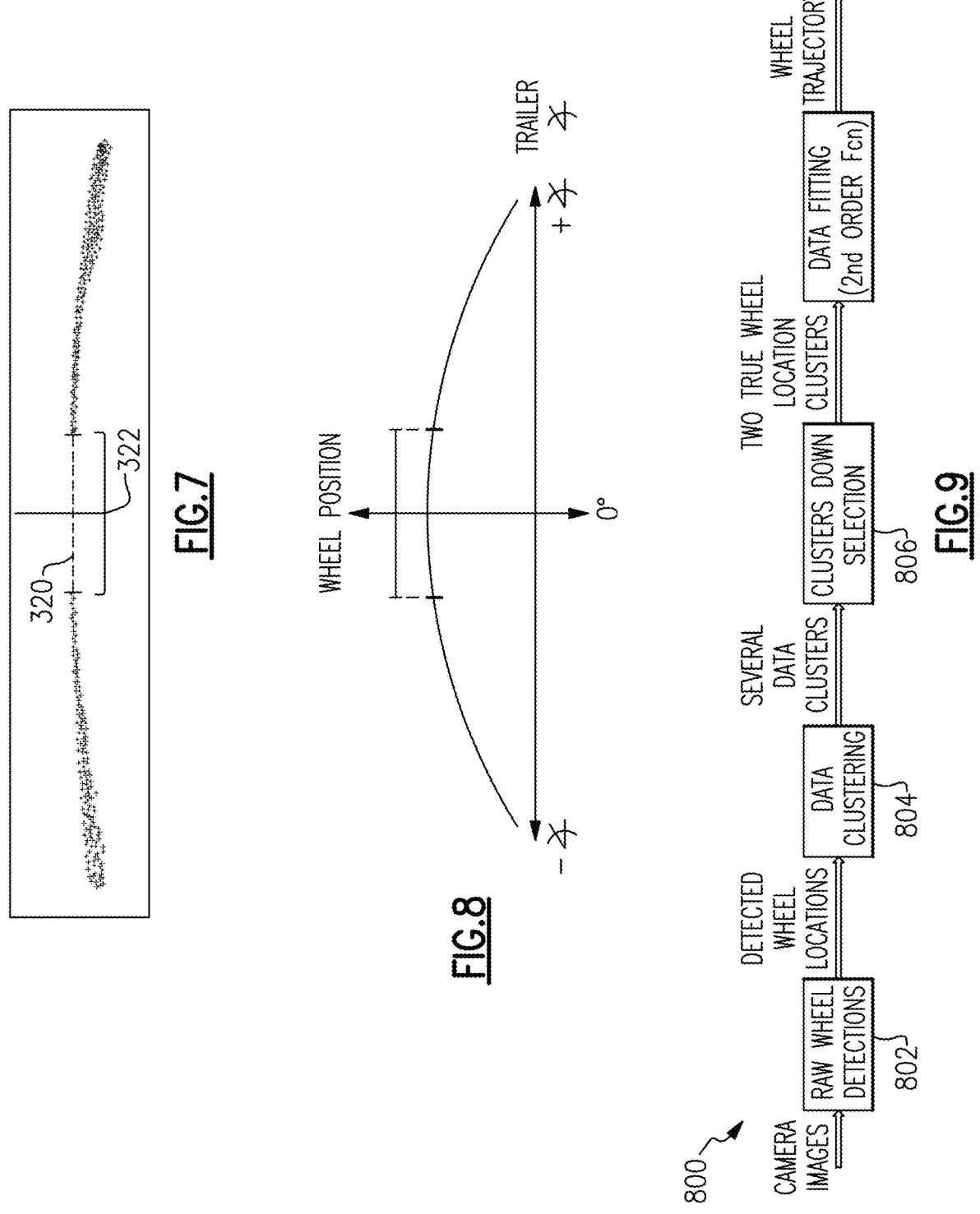
FIG. 7 illustrates a best fit curve line of the data set from FIGS. 4-7.
FIG. 8 illustrates the best fit curve line isolated from the data set.
FIG. 9 illustrates a process flow describing the transformation of raw wheel location data to the best fit curve illustrated in FIGS. 4-8.

With continued reference to FIGS. 1 to 3B, FIGS. 4-8 illustrate an on the road process for generating a wheel position estimation specific to a currently attached trailer 110 and FIG. 9 illustrates the process 800 flow for operating on the data sets of FIGS. 4-7. The process is capable of estimating hidden wheel positions without requiring trailer parameters such as height and length. While the example of FIGS. 4-9 is illustrated using data from a driver side view 102 and a passenger side view 104 (see FIG. 3B), resulting in an approximately symmetrical image, it is appreciated that, due to the symmetrical nature, a similar process can be applied to only a single view and generate similar wheel position estimations.

Figure 4:
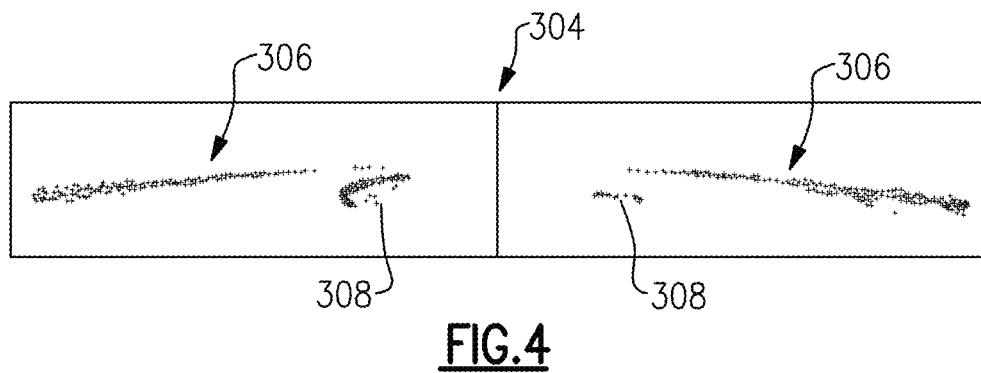
FIG. 4 illustrates a data set of trailer wheel positions within the image(s)
Figure 5:
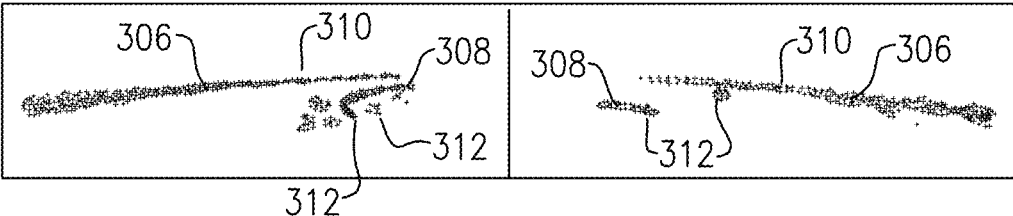
FIG. 5 illustrates the data set of FIG. 4 with the data sorted into clusters.

Initially upon operation of the vehicle wheel position data is aggregated over time to create a raw wheel position data set 304, illustrated in FIG. 4, in a "Raw Wheel Detections" step 802. The raw wheel detections use image analysis to identify wheel positions (i.e., the position of the wheel center point in the image) within the images provided by the CMS. Once the data set has been sufficiently populated to generate an estimation curve the data set 304 is referred to as a full data set. In some examples, the full data set includes at least 1000 wheel detections 306. In addition to the position of the center point 114 of the wheel 112 in the image, each data point has an associated corresponding trailer angle, as determined by any available trailer angle detection or estimation system, with the corresponding trailer angle being the trailer angle at the time the wheel position was captured. In some examples, once the data set has been sufficiently populated, the process 800 ceases adding data to the data set. In other examples, the process can be continuously updated with new detections as they become available, and the accuracy of the resulting estimation is continuously improved throughout the use of the vehicle.

In some cases, incorrect wheel position determinations can occur and may be added to the data set 304, resulting in additional data points 308 that could skew or otherwise impact the resulting estimation curve. In order to remove the false detections from the data set 304, and improve the resolution wheel position estimation, the raw data points 306 are clustered in a "Data Clustering" step 804. The clustering groups each data point 306 with nearby adjacent data points 306 based on the proximity of the data points 306 to other data points 306 and the density of the data points 306. In some example systems the clustering is done using one or more of a k-mean clustering process, a dbscan (density based spatial) clustering process, distribution based clustering process, a fuzzy clustering process, a mean shift clustering process, and a Gaussian mixed model clustering process. The clustering process results in multiple distinct clusters 310, 312 of wheel detections. It is appreciated that, in each view 102, 104, genuine wheel detections (data points 310) will result in a single elongated cluster 310 having a generally teardrop shape. False wheel detection 308 will result in one or more additional clusters 312, with the additional clusters 312 being random shapes.

Once the data is clustered, the clusters 312 related to false wheel detections 308 are discarded in a "Cluster Down Selection" step 806. In some examples, the cluster down selection can discard the data points 308 entirely, while in other examples, the data points 308 can be retained and flagged as false detections with the flagged false detections ignored for the remainder of the process 800. When retained, the data points can be reviewed later to improve the wheel detection systems, or used for other diagnostic features. For ease of reference, the clusters 310 including accurate wheel detections are referred to as "primary data clusters". In an example using views 102, 104 from each side of the vehicle, such as the example illustrated in FIGS. 4-7, two primary data clusters 310 exist and are retained. In alternate examples where only a single side (corresponding to a single view 102, 104) is utilized, a single primary data cluster is retained.

After discarding the clusters 312 containing false wheel detections, a single set of accurate wheel detections 306, illustrated in FIG. 6, remains. The process 800 determines a best fit curve that applies to all the wheel detections in both primary data clusters 310. In one example, the best fit curve is a parabolic line defined by a second order equation and that is the best fit for all the data across both the primary data clusters 310. In another example, the best fit curve is a parabolic line defined by a third order (cubic) equation. As used throughout, the best fit curve refers to the statistically determined curve that best approximates the trend of the scatter plot generated by the data.

The parabola defined by the second order best fit curve extends beyond each data cluster 310 and bridges a gap 322 between the low trailer angle of each data cluster. With continued reference to FIGS. 4-7 and 9, FIG. 8 illustrates parabola defining the best fit curve 320 isolated from the data, with a 0 degree trailer angle located in the center of the chart, and the trailer angle increasing to the right, and decreasing to the left of the chart. As the wheel position corresponds to the trailer angle, the CMS estimates that the wheel position is at the best fit line while the trailer angle is between negative 10 degrees and positive 10 degrees. In alternative examples, the gap 322 can be in different positions, however the estimation process can remain the same.

In yet further examples, once the best fit curve has been established, the best fit curve 320 can be used to estimate the wheel position any time the CMS cannot identify a wheel position in the image By way of example, if one of the cameras generating the views 102, 104 were to malfunction, or if a field of view 102, 104 becomes entirely or partially obstructed, the estimation can continue to provide an estimated wheel position as long as the trailer angle is determinable.

The estimation system and process described above generates an estimated wheel position with the image generated by the views 102, 104. The CMS controller and/or other vehicle system controllers convert the estimated image position to a corresponding three dimensional real world position and the corresponding three dimensional position can be used as needed.

In at least one example, the estimated wheel position is provided form the CMS controller to a trailer end detection module within the CMS system. The trailer end detection module can be a software module also positioned within the controller or a separate software system in communication with the CMS controller. The trailer end detection module uses the wheel location to assist in identifying the trailer end, and the trailer end position is marked in a CMS display to improve situational awareness of the vehicle operator. In another example, the wheel position may also be used by the CMS to estimate a position of the entire wheelbase and the wheelbase position can then be used within the CMS.

In another example, the estimated wheel position is provided to an advanced driver assistance system within the vehicle and separate from the CMS system.

Although an example embodiment has been disclosed, a worker of ordinary skill in this art would recognize that certain modifications would come within the scope of the claims. For that reason, the following claims should be studied to determine their true scope and content.

What is claimed is:

1. A method for estimating a trailer wheel position in a camera monitor system (CMS) of a commercial vehicle to enable continuous tracking when the wheel is hidden, comprising:

identifying a first set of wheel locations in a first image captured by a first camera of the CMS, each of the wheel locations in the first set of wheel locations being associated with a corresponding trailer angle;

clustering the first set of wheel locations and identifying a first cluster in the first set of wheel locations;

generating a curve based upon the first cluster, the curve associating wheel position to trailer angle;

identifying an estimated wheel position based upon a trailer angle and the curve when a wheel is not visible in the first image due to low trailer angle; and outputting the estimated wheel position to at least one additional vehicle system.

2. The method of claim 1, further comprising identifying a second set of wheel locations in a second image captured by a second camera of the CMS, each of the wheel locations in the second set of wheel locations being associated with a corresponding trailer angle, wherein the first image is a view on one side of a vehicle and the second image is a view on an opposite side of the vehicle.

3. The method of claim 2, further comprising clustering the second set of wheel locations and identifying a second cluster in the second set of wheel locations.

4. The method of claim 3, wherein generating the curve based upon the first cluster includes generating a curve based upon both the first cluster and the second cluster.

5. The method of claim 3, further including extending the curve from a first end of the first cluster to a first end of the second cluster, and wherein a region of the curve extending from the first end of the first cluster to the first end of the second cluster corresponds to wheel locations while the trailer angle is a low trailer angle, which is sufficiently low that the wheel is not visible in the first image or the second image.

6. The method of claim 5, wherein the low trailer angle is a trailer angle range of −10 degrees to +10 degrees.

7. The method of claim 1 wherein generating the curve includes generating a best fit curve.

8. The method of claim 1, wherein the curve includes a second order function.

9. The method of claim 1, wherein the curve is a third order function.

10. The method of claim 1, wherein identifying the first cluster comprises identifying a primary cluster including at least one of a greatest number of points and a largest cluster span.

11. The method of claim 1, further comprising applying at least one of a Kalman filter, a least-square filter, or a recursive least-square filter to the first cluster prior to generating the curve.

12. The method of claim 1, wherein the at least one additional vehicle system includes at least one of an advanced driver assistance systems, a camera monitor systems, or an electronic stability programs.

13. The method of claim 1 further including:

identifying an additional cluster in the first set of wheel locations; and discarding the additional cluster.

14. The method of claim 1 wherein the outputting causes the at least one additional vehicle system to perform an action selected from the group consisting of: marking a trailer end position in a CMS display, estimating a wheelbase position for advanced driver assistance, and adjusting an electronic stability program based on the estimated wheel position.

15. The method of claim 1 further including the at least one additional vehicle system marking a trailer end position in a display of the CMS based upon the estimated wheel position.

16. The method of claim 1 further including the at least one additional vehicle system estimating a wheelbase position for advanced driver assistance.

17. A camera monitor system (CMS) for a commercial vehicle configured to provide continuous wheel position tracking when the wheel is hidden, comprising:

at least one first camera having a first field of view defining a first side view on a first side of a vehicle;

a controller communicatively connected to the at least one first camera such that the controller receives a first image from the at least one first camera;

the controller including a memory and a processor, wherein the memory stores instructions configured to cause the controller to determine a wheel position estimation by identifying a first set of wheel locations in the first image, each of the wheel locations in the first set of wheel locations being associated with a corresponding trailer angle, clustering the first set of wheel locations and identifying a first cluster in the first set of wheel locations, and generating a curve based upon the first cluster, the curve associating wheel position to trailer angle; and the memory further storing instructions configured to cause the controller to respond to a wheel position being indeterminable in the first field of view due to a low trailer angle by generating an estimated wheel position based on the curve and the trailer angle.

18. The camera monitor system of claim 17, wherein generating an estimated wheel position comprises identifying a point on the curve corresponding to a currently detected trailer angle, wherein the point on the curve is the estimated wheel position.

19. The camera monitor system of claim 17, wherein the memory further stores instructions configured to cause the controller to identify a second set of wheel locations in a second image from a second camera having a second field of view defining a second side view on a second side of the vehicle, each of the wheel locations in the second image being associated with a corresponding trailer angle.

20. The camera monitor system of claim 19, wherein the memory further stores instructions configured to cause the controller to cluster the second set of wheel locations and identify a second cluster in the second set of wheel locations.

21. The camera monitor system of claim 20, wherein generating the curve based upon the first cluster includes generating a curve based upon both the first cluster and the second cluster.

22. The camera monitor system of claim 20, wherein the memory further stores instructions configured to cause the processor to extend the curve beyond the first cluster including extending the curve from a first end of the first cluster to a first end of the second cluster, and wherein a region of the curve extending from the first end of the first cluster to the first end of the second cluster corresponds to wheel locations while the trailer angle is sufficiently low that a wheel is not visible.

23. The camera monitor system of claim 20, wherein the memory further stores instructions configured to cause the processor to extend the curve beyond the first cluster including extending the curve from a first end of the first cluster to a first end of the second cluster, and wherein a region of the curve extending from the first end of the first cluster to the first end of the second cluster corresponds to wheel locations while the trailer angle is between −10 degrees and +10 degrees.

24. The camera monitor system of claim 19, wherein the first image is one of a class II or a class IV view on the first side of the vehicle and the second image is one of a class II or a class IV view on the second side of the vehicle.

25. The camera monitor system of claim 17, wherein the curve is at least a second order function.

26. The camera monitor system of claim 17, wherein identifying the first cluster comprises identifying a primary cluster based upon a number of points or a cluster span.

27. The camera monitor system of claim 17, wherein the memory further stores instructions configured to cause the controller to apply at least one of a Kalman filter, a least-square filter, or a recursive least-square filter to the first cluster prior to generating the curve.

28. The camera monitor system of claim 17 wherein generating a curve includes generating a best fit curve.

29. The camera monitor system of claim 17 in combination with at least one additional vehicle system configured to perform an action based upon the estimated wheel position selected from the group consisting of: marking a trailer end position in a CMS display, estimating a wheelbase position for advanced driver assistance, and adjusting an electronic stability program based on the estimated wheel position.

30. Camera monitor system of claim 17 in combination with at least one additional vehicle system marking a trailer end position in a display of the CMS based upon the estimated wheel position.

31. The camera monitor system of claim 17 in combination with at least one additional vehicle system estimating a wheelbase position for advanced driver assistance based upon the estimated wheel position.

32. A camera monitor system (CMS) for a commercial vehicle configured to provide continuous trailer wheel position tracking, comprising:

at least one first camera having a first field of view defining a first side view on a first side of the commercial vehicle;

a controller communicatively connected to the at least one first camera such that the controller receives a first image from the at least one first camera;

the controller including a memory and a processor, wherein the memory stores instructions configured to cause the controller to identify a first set of wheel locations in the first image, each of the wheel locations in the first set of wheel locations being associated with a corresponding trailer angle, clustering the first set of wheel locations and identifying a first cluster in the first set of wheel locations, and generating a curve based upon the first cluster, the curve associating wheel position to trailer angle; and the memory further storing instructions configured to cause the controller to respond to a wheel position being indeterminable in the first field of view due to a low trailer angle by generating an estimated wheel position based on the curve and the trailer angle and to output the estimated wheel position to at least one additional vehicle system for use in performing an action selected from the group consisting of: marking a trailer end position in a CMS display, estimating a wheelbase position for advanced driver assistance, and adjusting an electronic stability program based on the estimated wheel position.

33. The camera monitor system of claim 32, wherein generating an estimated wheel position comprises identifying a point on the curve corresponding to a currently detected trailer angle, wherein the point on the curve is the estimated wheel position.

34. The camera monitor system of claim 32, wherein the memory further stores instructions configured to cause the controller to identify a second set of wheel locations in a second image from a second camera having a second field of view defining a second side view on a second side of the commercial vehicle, each of the wheel locations in the second image being associated with a corresponding trailer angle, wherein the memory further stores instructions configured to cause the controller to cluster the second set of wheel locations and identify a second cluster in the second set of wheel locations, wherein generating the curve based upon the first cluster includes generating a curve based upon both the first cluster and the second cluster.

35. The camera monitor system of claim 34, wherein the memory further stores instructions configured to cause the controller to extend the curve beyond the first cluster, including extending the curve from a first end of the first cluster to a first end of the second cluster, and wherein a region of the curve extending from the first end of the first cluster to the first end of the second cluster corresponds to wheel locations while the trailer angle is sufficiently low that a wheel is not visible.

36. The camera monitor system of claim 34, wherein the memory further stores instructions configured to cause the controller to extend the curve from a first end of the first cluster to a first end of the second cluster, and wherein a region of the curve extending from the first end of the first cluster to the first end of the second cluster corresponds to wheel locations while the trailer angle is between −10 degrees and +10 degrees.

\* \* \* \* \*